United States Patent
Popp et al.

(10) Patent No.: US 7,885,500 B2
(45) Date of Patent: Feb. 8, 2011

(54) APPARATUS AND METHOD FOR ADJUSTING AN OPTICAL ROTATING DATA TRANSMISSION DEVICE

(75) Inventors: Gregor Popp, Munich (DE); Matthias Rank, Willmering (DE); Markus Stark, Waizendorf (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 766 days.

(21) Appl. No.: 11/748,621

(22) Filed: May 15, 2007

(65) Prior Publication Data

US 2007/0268805 A1 Nov. 22, 2007

(30) Foreign Application Priority Data

May 16, 2006 (DE) .................. 10 2006 023 086
Mar. 23, 2007 (EP) .................. 07104775

(51) Int. Cl.
*G02B 6/36* (2006.01)
*G02B 6/38* (2006.01)

(52) U.S. Cl. .............. 385/52; 385/72; 385/78
(58) Field of Classification Search .......... 385/52
See application file for complete search history.

(56) References Cited

U.S. PATENT DOCUMENTS

| | | | | |
|---|---|---|---|---|
| 4,265,511 A | * | 5/1981 | Nicia et al. | 385/74 |
| 4,815,812 A | * | 3/1989 | Miller | 385/61 |
| 4,848,867 A | | 7/1989 | Kajioka et al. | |
| 5,039,193 A | | 8/1991 | Snow et al. | |
| 5,095,517 A | * | 3/1992 | Monguzzi et al. | 385/90 |
| 5,157,745 A | | 10/1992 | Ames | |
| 6,263,133 B1 | * | 7/2001 | Hamm | 385/33 |
| 2003/0185519 A1 | * | 10/2003 | Ushinsky | 385/72 |
| 2006/0093276 A1 | * | 5/2006 | Bouma et al. | 385/72 |

FOREIGN PATENT DOCUMENTS

JP 57-139717 8/1982

* cited by examiner

*Primary Examiner*—Michelle R Connelly Cushwa
(74) *Attorney, Agent, or Firm*—Kevin L. Daffer; Daffer McDaniel, LLP

(57) ABSTRACT

The invention relates to a method for adjusting an optical rotating data transmission device having two units that are rotatable with respect to each other about a rotation axis, and that each have a coaxial collimator for coupling light in or out, and relates also to an optical rotating data transmission device that is adjustable by means of the method. For an adjustment, a deviation of a light beam from the rotation axis is determined by means of two detectors at different distances, and from this a positional deviation and also a tilt of the light beam is calculated and suitably compensated.

7 Claims, 4 Drawing Sheets

APPARATUS AND METHOD FOR ADJUSTING AN OPTICAL ROTATING DATA TRANSMISSION DEVICE

CROSS REFERENCE TO RELATED APPLICATIONS

This application claims priority from German Application 10 2006 023 086.8, filed on May 16, 2006, now abandoned, and pending European Patent Application 07 104 775.1, filed on Mar. 23, 2007.

BACKGROUND OF THE INVENTION

1. Field of the Invention

The invention relates to a method for adjusting an optical rotating data transmission device having two units that are rotatable with respect to each other about a rotation axis, which each have a coaxial collimator for coupling light in or out, and also an optical rotating data transmission device that is adjustable by means of the method, and furthermore, an apparatus for performing the method.

2. Description of the Related Art

A single-channel, single-mode rotating data transmission device is disclosed in U.S. Pat. No. 5,039,193. GRIN lenses are used as collimators.

U.S. Pat. No. 4,815,812, discloses another single-channel rotating data transmission device in which the collimators in the form of GRIN lenses are accommodated in ferrules. The position of these ferrules is adjustable in one plane perpendicular to the rotation axis by means of adjusting screws, and may be fixed by means of an epoxy resin after adjustment.

With rotating data transmission devices of the species mentioned initially, the optical axes of the collimators must be coaxial to the rotation axis of the units. Each deviation of the axes from each other leads to an attenuation of the signal, i.e. to a deterioration of the transmission quality. The adjustment of a rotating data transmission device is frequently not possible for reasons of design, or attended by very high outlay. Therefore, prefabricated collimators having close tolerances must be employed. Particularly with GRIN lenses, there is a problem of the optical axis being tilted with respect to the geometrical axis. Here only expensive, pre-selected components can be employed.

SUMMARY OF THE INVENTION

The invention is based on the object of providing an adjustment method of the species initially mentioned, and also a rotating data transmission device that is adjustable by means of such a method. Furthermore, an apparatus for performing the method is to be set out.

In accordance with the invention, one of the above objects is achieved by a method for adjusting an optical rotating data transmission device having two units that are rotatable with respect to each other about a rotation axis, at least one unit having a coaxial collimator for coupling light in or out, comprising the steps of:

a. inserting the collimator into a first of the two units;
b. feeding light into the collimator;
c. measuring a distance of a light-beam axis from the rotation axis at two positions corresponding to two different lengths of light paths;
d. determining a tilt of an optical axis of the collimator from the rotation axis, and also a distance of the light-beam axis from the rotation axis from data measured in step c; and
e. minimizing the distance and the tilt between the light-beam axis and the rotation axis by at least one of shifting and tilting the collimator.

In accordance with the invention, one of the above objects is also achieved by a method for adjusting an optical rotating data transmission device having two units that are rotatable with respect to each other about a rotation axis, at least one unit having a coaxial collimator for coupling light in or out, comprising the steps of:

a. inserting the collimator into a first of the two units;
b. feeding light into the collimator;
c. measuring a distance of the light-beam axis from the rotation axis by means of a detector, shading-off a part of the detector with a shadow object located at a known position in a beam path between collimator and detector, and measuring a shadow position on the detector;
d. determining a tilt of an optical axis of the first collimator from the rotation axis, and also a distance of the optical axis from the rotation axis from data measured in step c; and
e. minimizing the distance and the tilt between the light-beam axis and the rotation axis by at least one of shifting and tilting the collimator.

In accordance with the invention, another of the above objects is achieved by an optical rotating data transmission device having two units that are rotatable with respect to each other about a rotation axis, the units each having a collimator for coupling light in or out: wherein at least one of the collimators is supported in its respective unit by two component parts; wherein the two component parts act in different planes that are orthogonal to an optical axis of the at least one collimator; wherein the component parts for adjusting a location of the collimator with respect to the rotation axis are each adapted to be shifted relative to the respective unit at least in a plane that is orthogonal to the rotation axis; wherein at least a first of the two component parts has a flat surface directly contacting the respective unit; and following an adjustment of its position relative to the respective unit, at least the first component part is fixed without any gap by means of a setting compound.

In accordance with the invention, another of the above objects is achieved by a device for adjusting rotating data transmission devices, comprising at least one retainer and positioning unit for accommodating at least one unit of a rotating data transmission device together with at least one collimator: wherein the at least one unit is adapted to be adjusted, via a first component part and a second component part, by control elements of the retainer and positioning unit with respect to distance and tilt angle of a light-beam axis of the at least one collimator from a rotation axis of the rotating data transmission unit; wherein a first detector is provided at a given spacing from the at least one collimator, and also a second detector at a greater given spacing from the at least one collimator; and wherein an evaluation and control unit is provided which, with the aid of signals from the detectors, determines the distance and also the tilt angle of the light-beam axis of the at least one collimator from the rotation axis of the rotating data transmission device, and emits at least one corresponding control signal to the retainer and positioning unit for adjustment of the distance and also the tilt angle of the light-beam axis.

BRIEF DESCRIPTION OF THE DRAWINGS

In the following the invention will be described by way of example, without limiting the general inventive concept, on examples of embodiment and with reference to the drawings.

DETAILED DESCRIPTION OF PREFERRED EMBODIMENTS

Figure 1:
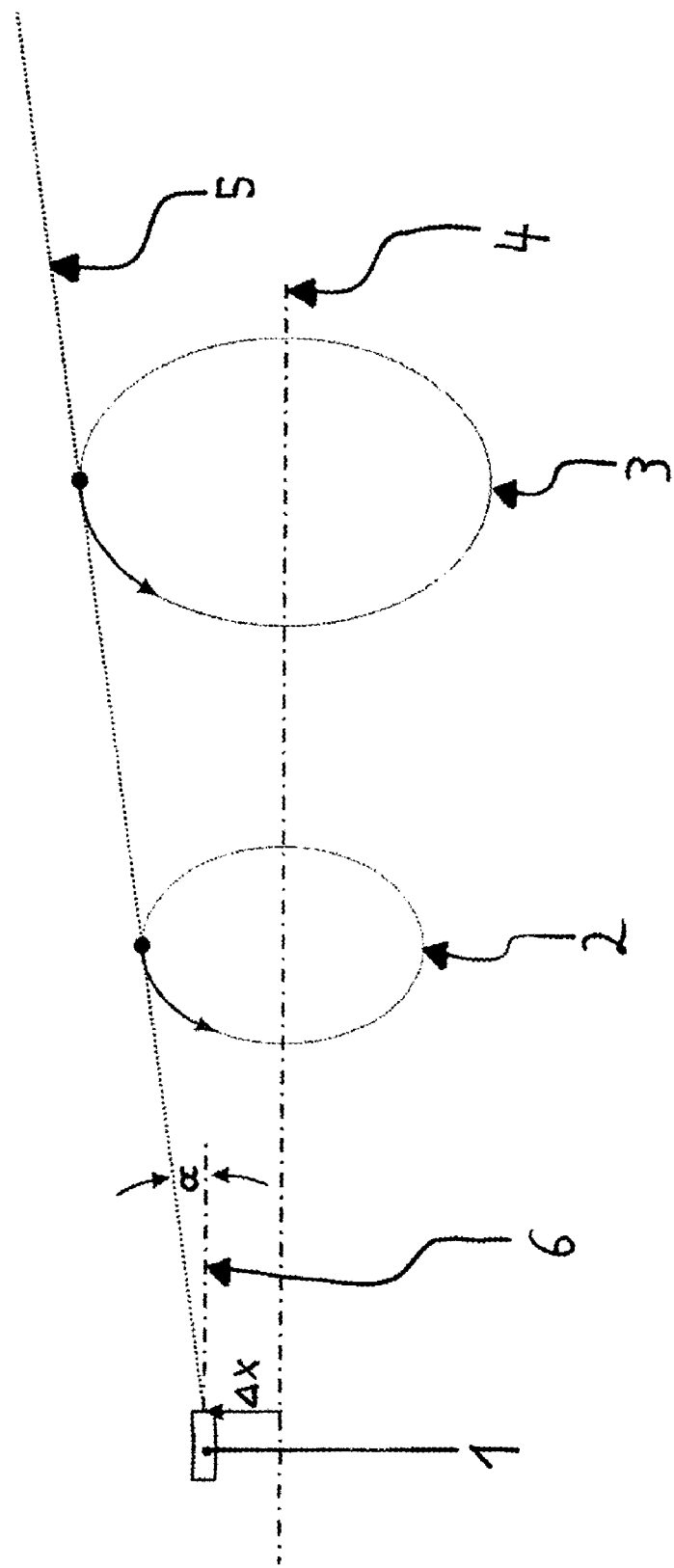
FIG. 1 illustrates the principle of the method according to the invention.

The method of the present invention comprises the steps of:
a. inserting a first collimator into a first of two units;
b. feeding light into the first collimator;
c. measuring the distance of the light-beam axis from the rotation axis at two positions corresponding to two different lengths of light paths;
d. determining the tilt a of the light-beam axis from the rotation axis, and also the distance $\Delta x$ of the optical axis from the rotation axis, from the data measured in step c;
e. minimizing the distance and the tilt between the light-beam axis and the rotation axis by shifting, and/or tilting the first collimator; and
f. positioning the other collimator.

In accordance with this method, the two units are first each individually pre-assembled, i.e. the units by themselves are each assembled to the extent that a collimator is inserted into the first unit, and another collimator is inserted into the second unit, but not yet fixed to the unit. Any ancillary components not needed for the adjustment may be mounted later.

A unit prepared in this manner is then adjusted. For this, first of all light is fed into the collimator of the prepared unit on the side facing away from the complementary unit. This is effected, for example, via a light-waveguide firmly fixed to the collimator, for example a single-mode fiber, or also a multi-mode fiber.

Then the distance of the light-beam axis from the rotation axis is measured at two positions of the light path spaced from each other. The light-beam axis is the axis of symmetry of the light beam issuing from the collimator.

Preferably, the light-beam for the two distance measurements is split by means of a beam splitter and simultaneously detected by means of two detectors. Similarly, of the two detectors, the one that is closest to the collimator can be swiveled into the light path, so that the measurements can be performed successively. The detectors may be, for example, CCD or CMOS cameras, 4, quadrant diodes or "beam scopes." Alternatively, one single detector of adjustable position, i.e. distance from the collimator, also may be used.

From the measured distances, the tilt is determined, which is the angle between the light-beam axis and the rotation axis (including the tilt direction) when the axes are shifted by parallel shifting so that they have a point of intersection. In addition, a shift vector is determined which images the light beam axis onto the rotation axis at an assumed corrected tilt. This vector is preferably chosen to be identical with the distance vector from the light-beam axis to the rotation axis.

In the next step the collimator is tilted counter to the tilt determined in step d., and shifted according to the shift vector. In an optimal case the axis of the light beam then lies on the rotation axis.

Subsequently, the measurement of the distances of the light-beam axis from the rotation axis can be repeated in order to check the positioning of the collimator. If necessary, the collimator can be once again tilted and/or shifted. This operation (i.e., steps c, d, and e) is repeated until the tilt and the distance of the optical axis of the collimator from the rotation axis are minimal. Minimal means that the attenuation resulting from the deviation of the light-beam axis from the rotation axis has been optimized or lies within a given range of tolerance.

When the optimum location and position of the collimator in the prepared unit has been found, the collimator is fixed in the unit, for example, by application of an adhesive or laser welding.

Application of an adhesive is preferably effected so that the parts to be fixed with respect to each other are in direct surface contact or, in other words, the application of adhesive is effected preferably without leaving any gap. Thereby, the location and position of the collimators with respect to the rotation axis do not change as a result of volume changes of the adhesive caused by temperature fluctuations.

Preferably the method is performed in an adjusting apparatus for fixing those faces of a suitably preassembled unit by means of which, in an assembled rotating data transmission device, the position of a complementary unit is determined relative to the unit located in the adjusting apparatus.

The tilting and shifting of the collimators may be effected, for example, by means of adjusting screws. For this, preferably three adjusting screws at a time act, in two planes that are spaced as far as possible from each other and are orthogonal to the optical axis, on a site such as the peripheral edge of the collimator to be shifted or tilted. The screws are preferably each coupled with a step motor, so that a control means can calculate the necessary rotation numbers directly from the distances measured in step d., and trigger the step motors accordingly. Similarly, the collimators can be placed in the desired position and location by means of actuators, for example piezo-actuators. The planes in which the adjusting apparatus acts are also designated as being adjustment planes.

The second collimator may be positioned according to the steps a-e and then fixed. The preliminary assembly of this collimator may be effected at any time, prior however to the beginning of step a. Of course, a method in accordance with the invention may be performed also by beginning with the second collimator.

Similarly, the second collimator may be determined following an adjustment of the first collimator also by measuring the attenuation of the assembled rotating data transmission device. For this, light is fed into a collimator and is detected at the other collimator, so that the attenuation is known. Now the two units are rotationally displaced with respect to each other through a known angle, for example 90°, and subsequently the attenuation is again measured. Subsequently, the second collimator is tilted in dependence upon the measured attenuations, and shifted to minimize the attenuations. This operation is iterated until the attenuation is a minimum and, as far as possible, not dependent upon the angle of rotational displacement of the two units. Finally, the second collimator also is fixed. This may be effected as for the first collimator.

In another variant of the method according to the invention, the step c may also consist of the following steps:
c1. Measuring the distance of the light beam axis from the rotation axis by means of a detector;
c2. shading-off a part of the detector with a shadow object located at a known position in the beam path between collimator and detector; and
c3. measuring the shadow position on the detector.

The other steps are performed as previously described.

The rotary data transmission device in accordance with the invention has two units which can be rotationally displaced with respect to each other, and each have a collimator for coupling light in or out. The mountings of the collimators in their respective units can be functionally equivalent to each other. Therefore only the mounting of one collimator in one unit will be described in the following.

The collimator is supported in the unit by two component parts 16 and 18. For this, the two component parts act on two different planes that are orthogonal to the optical axis of the first collimator. Preferably these planes are spaced to be as far as possible from each other. For the previously described adjustment, the component parts are displaceable relative to the unit. Preferably the component parts are displaceable orthogonally to the rotation axis. At least one of the two component parts is disposed to have a surface directly contacting the first unit, and may have its position fixed with respect to the unit, i.e. without a gap by means of an adhesive, for example with a setting compound such as an epoxy resin which acts as an adhesive. If the second component part is not also disposed to have a surface directly contacting the unit, it may be disposed to have a surface directly contacting the first component part. In any case, the second component part can be fixed to be vibration-proof. Because the component parts are disposed to have a surface directly contacting the unit, or each other, the rotating data transmission device is comparatively insensitive to temperature fluctuations, one reason for this being that changes of volume of a setting compound used for fixing, i.e. of an adhesive, caused by temperature fluctuations, do not affect the location of the component parts with respect to each other, or to the unit, and therefore also do not affect the location of the collimator, supported by the component parts, with respect to the unit.

For adjustment, the unit is preliminarily assembled at least to the extent that it comprises both component parts and the collimator. In order to minimize the distance and the tilt between the light-beam axis and the rotation axis in accordance with the previously described method, preferably an adjustment apparatus is used. The adjustment apparatus comprises adjusting mechanisms that act upon both component parts. By shifting the component parts by means of the adjusting mechanisms, the collimator is optimally positioned. The shifting of both component parts is effected preferably in planes that are orthogonal to the rotation axis, i.e., in each case along two axes orthogonal to the rotation axis. After the positioning, the component parts are secured in their respective positions with a small amount of adhesive, for example an epoxy resin, whereby also the collimator is fixed.

It is of advantage for the planes disposed to be orthogonal to the optical axis to be at a distance from each other that is greater than ½, and preferably greater than 9/10, of the length of the first collimator.

An apparatus in accordance with the invention for performing the method comprises a retainer and positioning unit in which a first unit and/or a second unit may be inserted optionally. A unit inserted into this retainer must comprise at least one collimator. Furthermore, at least one first detector is provided at a given spacing from the collimator. This detector is disposed so that it can determine the position of light issuing from the collimator relative to the prospective rotation axis of the rotating data transmission unit when completely assembled. The rotation axis of the completed rotating data transmission unit corresponds to the center axis of the first unit, or the second unit. Furthermore, a second detector is provided which is disposed at a greater given spacing from the collimator. This detector also is disposed so that it can determine the position of light issuing from the collimator relative to the prospective rotation axis of the rotating data transmission unit when completely assembled. An evaluation unit is provided for evaluating the signals from the detectors, which evaluates the signals of the detectors and emits one or a plurality of control signals to the retainer and positioning unit for adjustment of the unit to be adjusted. The detector is preferably adapted so that at least a part of the light beam can still pass through it, so that a sufficient measuring signal is available for the detector. This can be achieved, for example, by coupling out by means of a partly transmitting mirror, or a prism. Instead of the two detectors, a single detector also may be employed to successively occupy the two positions of the detectors.

FIG. 1 shows a collimator 1 having a light-beam axis 5 tilted from the axis of symmetry 6 of its housing. Here the axis of symmetry 6 is parallel to the rotation axis 4 of the units (not shown) that are rotationally displaceable from each other. In order to achieve an optimal, i.e. minimal attenuation of the assembled rotating data transmission device, the distance between the light-beam axis 5 and the rotation axis 4 is measured at two locations that are spaced from each other, by means of two detectors 2 and 3 that are spaced from each other. From the measured distances, the tilt a between the rotation axis and the light beam axis can be determined. Similarly, the distance vector $\Delta x$ between the last mentioned axes can be determined. If the collimator is now shifted by $-\Delta x$ and tilted through $-\alpha$, then the optical axis is identical with the rotation axis.

Figure 2:
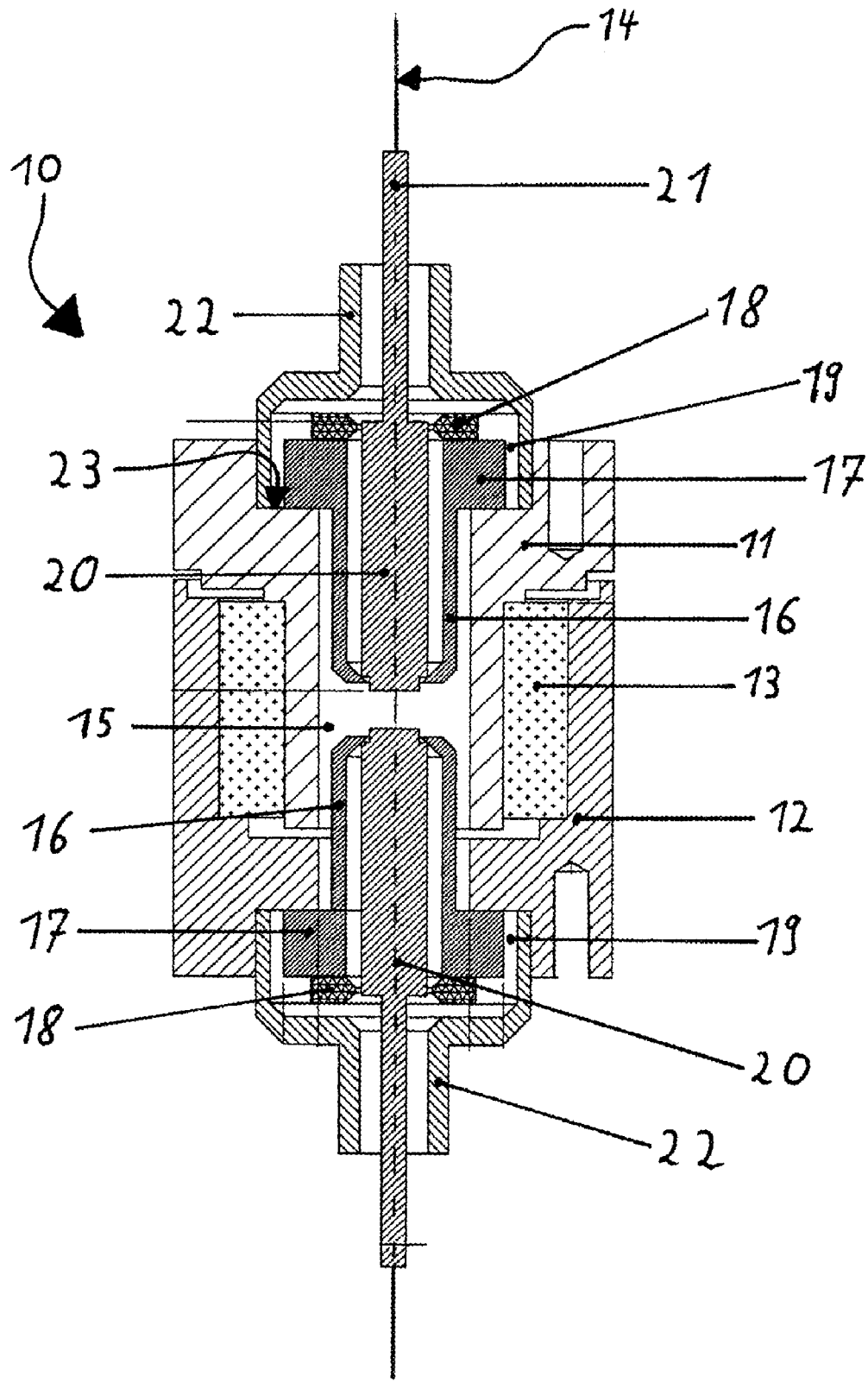
FIG. 2 shows a cross-section through an example of embodiment of a rotary data transmission device according to the invention.

The optical rotating data transmission device 10 illustrated in FIG. 2 has a first unit 11 and a second unit 12 that are joined by means of a bearing 13 to be freely rotatable with respect to each other about a rotation axis 14. The first unit has a recess 15 that is rotationally symmetrical to the rotation axis, and adjoins the end faces of the first unit. The recess 15 is widened stepwise towards the end face facing away from the unit 12. The step 23 serves as a stop for a flange 17 of a substantially hollow-cylindrical first component part 16 seated in the stepped recess 15. The first component part 16 can be displaced in the recess along the step 23. The end region of the first component part 16 facing the second unit 12 is tapered in the shape of a hollow-cone segment. A collimator 20 is seated in the first component part 16. The collimator 20, corresponding to the collimator 1 of FIG. 1, has a stepwise tapered outer sheath. At the step, the peripheral edge of the collimator 20 is seated in the taper having the shape of a hollow-cone segment.

The other end of the collimator passes through an annular second component part 18 seated flatly on the end face of the first component part 16 facing away from the second unit 12. The width of the annular second component part 18 is tapered towards the inside. The blade formed thereby supports the collimator 20 at its end that faces away from the second unit 12. The second component part 18 is adapted to slide along the end face. When the second component part 18 is displaced along the end face, this tilts the collimator with respect to the rotation axis 14. If the first component part 16 is displaced along the step 23, taking with it the second component part 18, then the collimator is thereby shifted parallel to the rotation axis 14. Thus, the optical axis of the collimator can be imaged on the rotation axis 14 by shifting the first component part 16 and the second component part 18. Once the optimum position of the collimator has been found, then the first component part 16 is fixed by means of an adhesive. Here the fixing should be effected without any gap. Then the position of the first component part 16 relative to the first unit 11 is not dependent upon volume fluctuations of the adhesive caused by temperature. When referring to the invention, "without any gap" means that the component parts are adhered to each other with a minimum gap. A typical thickness of a gap of this kind is below 0.1, mm. Thus, no thick layer of an adhesive or a filling material is present.

Contrary to this, a relatively large adhesive-filled gap is disclosed in U.S. Pat. No. 4,815,812. Thus, even the entire hollow space left behind the collimator is filled with adhesive or filling material. The disadvantage of large adhesive-filled gaps is that the material used as adhesive frequently has a different temperature coefficient than the surrounding material of the housing. Thereby, in particular, thick adhesive layers cause undesired expansion and thus undesired displacements, or also tilts, of the arrangement. A fixing without any gaps is effected in the case of the flange 17 by applying a thin layer of adhesive onto the step 23 of a unit 11, 12. By urging the component parts against each other mechanically, the remaining adhesive can be squeezed out of the gap. No adhesive should be allowed to enter the gap 19 between the flange 17 and the cap 22 protecting from dust and buckling, because it would then cause a lateral displacement of the flange 17 owing to thermal expansion. A thin layer of adhesive between the flange 17 and the step 23 of a unit 11, 12 would at most lead to a displacement along the direction of the optical axis. However, this has no substantial effect on the attenuation of the rotating data transmission device, because the collimators produce parallel light rays. For this reason, no adjustment is made also of the longitudinal axis of the optical rotating data transmission device. Similarly, the annular second component part 18 is fixed to the first component part without any gap. For this, a thin, flat coating of adhesive is applied on the contacting faces of the annular second component part 18 with the first component part 16.

It is an essential aspect of this embodiment of a rotating data transmission device that an intentional shifting of suitable parts makes possible a shifting or positioning perpendicular to the rotation axis, and that an intentional shifting of further parts makes possible an intentional tilting. Thus, hitherto a cylindrical collimator within a cylindrical sleeve frequently had to be maintained within these four axes by means of a separate positioning means, and then fixed with an adhesive. Now, a shifting of the flange 17 together with the collimator 20 and the annular second component part 18 can effect an adjustment along two axes perpendicular to the rotation axis, and a shifting of the annular second component part 18 can effect adjustment of the tilting along two axes.

After the two component parts 16, 18 and therewith the collimator 20 have been fixed, a cap 22 protecting from dust and buckling is inserted into the gap 19. The cap 22 has a central passage for a single-mode light guide 21, one end of which is connected to the collimator, and the other end of which serves for feeding-in and/or receiving data.

The second unit is constructed to be functionally equivalent to the first unit. The same parts have been designated by the same reference symbols.

Figure 3:
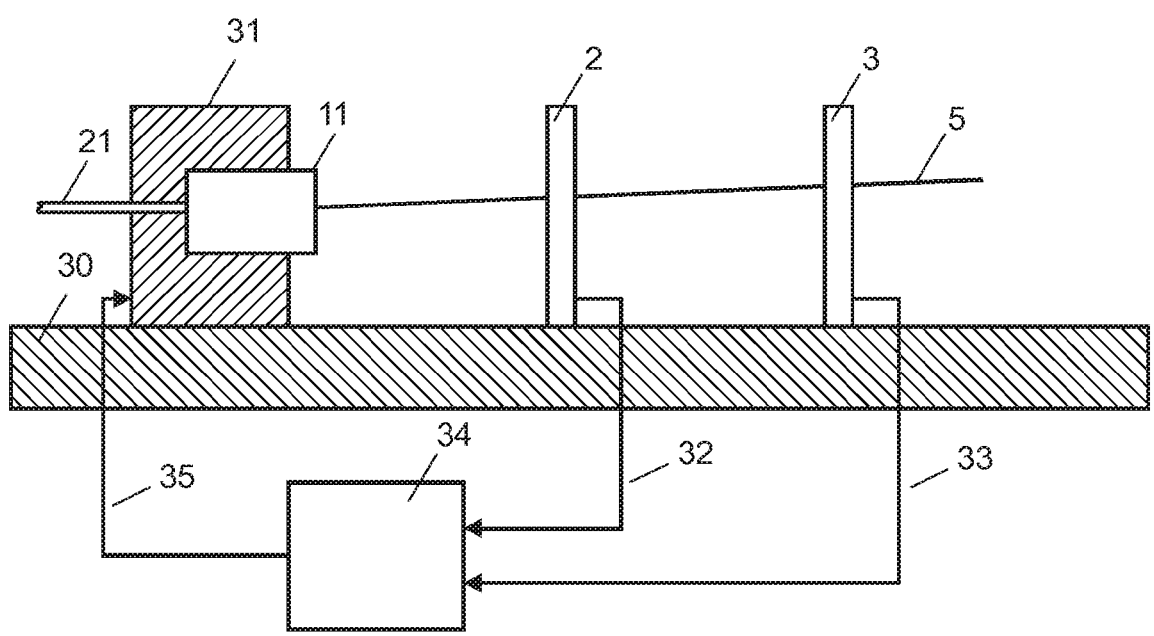
FIG. 3 shows an example of embodiment of an apparatus for performing the method.

FIG. 3 shows an example of an apparatus for performing the method. A support plate 30, for example an optical bench, serves to accommodate the optical components. The units to be adjusted, here for example a first unit 11, are accommodated in a retainer with positioning unit 31. The positioning unit serves the purpose of adjusting the adjustable components such as the first component part 16 and the second component part 18 in accordance with determined measurement results. Light is fed by a light source, not shown here, into the light waveguide 21. This emerges through the collimator in the unit 11 to be adjusted along the light-beam axis 5. The detectors 2 and 3 measure the position of the light coupler, or the deviation of the light-beam axis from the rotation axis of the unit to be adjusted, and transmit corresponding signals 32 and 33 to an evaluation and control unit 34. From the measured values this determines suitable setting or correction values for triggering the retainer and positioning unit 31 by means of one or more control signals 35.

Figure 4:
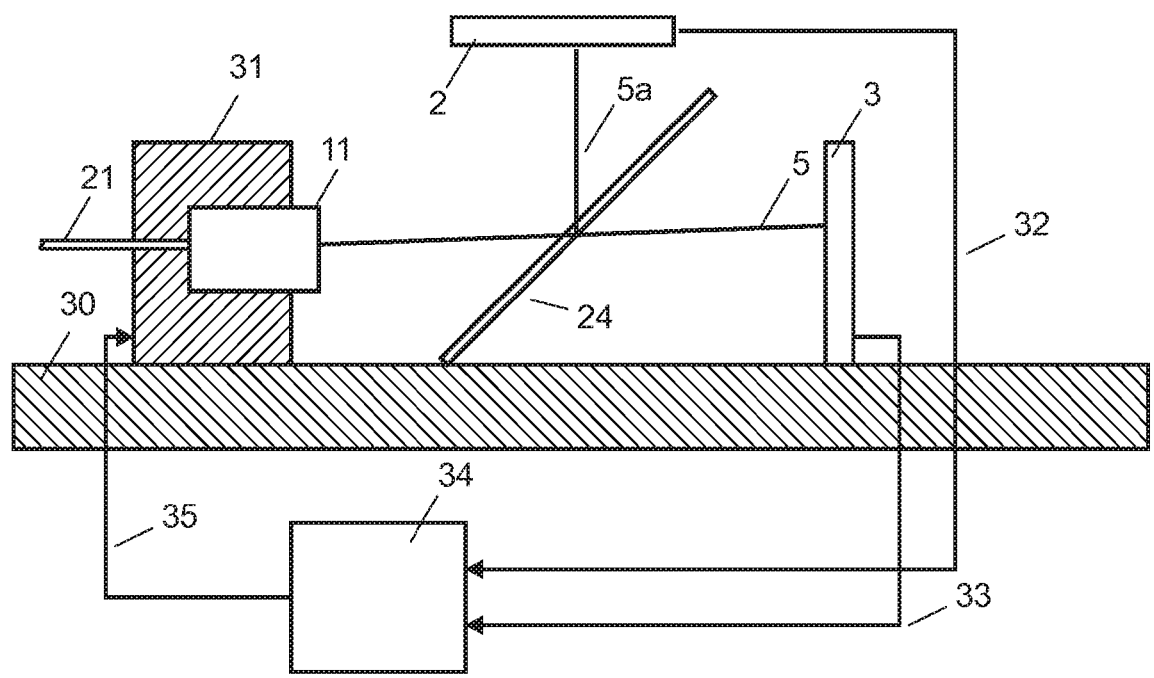
FIG. 4 shows an example of embodiment of an apparatus for performing the method, comprising a beam splitter.

FIG. 4 schematically shows an arrangement with a beam splitter 24. This beam splitter couples-out a part of the light beam along a new partial light beam axis 5a, to a detector 2, and lets another part pass to a detector 3. In this case, both detectors, in particular the detector 2, may be designed to be absorbing.

Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

The invention claimed is:

1. An optical rotating data transmission device having two units that are rotatable with respect to each other about a rotation axis, the units each having a collimator for coupling light in or out:
    wherein at least one of the collimators is supported in its respective unit by two component parts;
    wherein the two component parts act in different planes that are orthogonal to an optical axis of the at least one collimator;
    wherein the component parts for adjusting a location of the collimator with respect to the rotation axis are each adapted to be shifted independent of each other relative to the respective unit orthogonal to the rotation axis;
    wherein at least a first of the two component parts has a flat surface directly contacting the respective unit; and
    following an adjustment of its position relative to the respective unit, at least the first component part is fixed without any gap by means of a setting compound.

2. The device according to claim 1, wherein following the adjustment by means of a setting compound, the two component parts have flat surfaces directly contacting each other.

3. The device according to claim 1, wherein the two component parts each act on at least three sites at the periphery of the first collimator.

4. The device according to claim 1, wherein the planes that are orthogonal to the optical axis have a spacing that is greater than ½ of the length of the at least one of the collimators.

5. The device according to claim 1, wherein the planes that are orthogonal to the optical axis have a spacing that is greater than 9/10 of the length of the at least one of the collimators.

6. The device according to claim 1, wherein the setting compound is applied only between securement surfaces of the two component parts and the respective unit, wherein each of the securement surfaces extend orthogonal to the optical axis.

7. The device according to claim 1, wherein the different planes are parallel to one another.

* * * * *